M. G. HUBBARD.
Harvester.
No. 22,953. Patented Feb. 15, 1859.
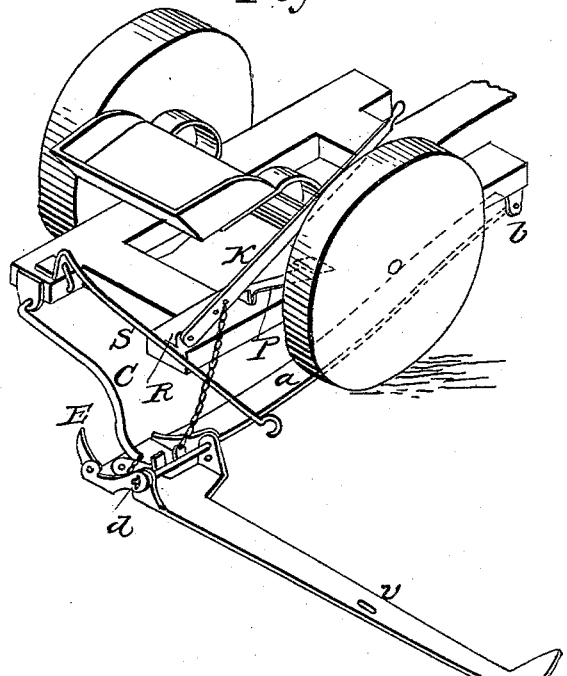
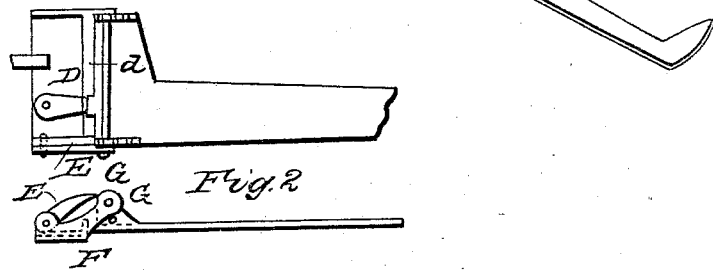
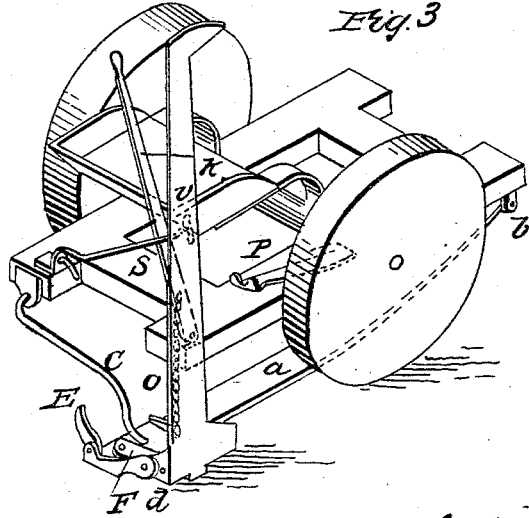
Witnesses
Inventor
M. G. Hubbard.

UNITED STATES PATENT OFFICE.

M. G. HUBBARD, OF PENN YAN, NEW YORK.

IMPROVEMENT IN HARVESTERS.

Specification forming part of Letters Patent No. 22,953, dated February 15, 1859.

*To all whom it may concern:*

Be it known that I, M. G. HUBBARD, of Penn Yan, Yates county, and State of New York, have invented certain new and useful Improvements in Mowing-Machines; and I do hereby declare that the following is a true, clear, and exact description of the same, reference being had to the accompanying drawings illustrative thereof.

The improvements ascertained relate to the attachment of the cutting apparatus to my two-wheeled mowing-machine and the means for raising and sustaining it while passing over obstacles. My experience in the operation of these machines has demonstrated the absolute necessity for a slight elastic force to hold the cutting apparatus to the ground whenever sudden inequalities or small stones are to be encountered, and also that the attachment should be adjustable, so that the outer end of the cutting apparatus may be made free to rise and fall when at work upon a very undulating surface, and also that the said attachment should be such that when required to work among fixed obstacles—such as projecting stumps or large stones—it can be so arranged that the driver can readily raise it without moving from his seat; and I have also found it to be an all-important item in this attachment that it should be so arranged that it may readily be made to cut at different heights from the ground, in order to change the length of stubble as circumstances may require; and it is desirable that the said attachment should be such that the projecting cutting apparatus may be folded and the machine brought into the narrowest possible compass for transportation and storage. All these important objects I have attained by the improvements herein described, and without compelling an inexperienced farmer to remove or change any of the permanent parts of the machine.

The general arrangement of my machine is the same that I have heretofore used, except the improvements above enumerated, and which are fully illustrated in Figure 1, which is a perspective view of the machine, and Fig. 2, which is a view of the ordinary hinge attachment which I use for connecting the cutting apparatus with the machine, and shows the new features in its construction which form a part of my improvements herein described, and Fig. 3, hereinafter described.

I hinge the bar A to the front end of the machine at *b*, and extend this bar back to the rear end of the machine and down to the ground, where it is firmly united with the bar C, which is curved up, and extends to the opposite rear corner of the machine. This bar may be made elastic itself, or it may be connected with the left-hand sill by a coil-spring or by a rod extending forward and fastened to the frame, so as to act as a tension-spring and exert an elastic force upon the bar C, so that I thereby attain an elastic angle or yielding corner of great strength for the attachment of the cutting apparatus. I have tried making the bar A elastic and freely hinging the bar C; but when the bar A is made elastic a stiffer spring is required than when the bar C is elastic, because the bar A is necessarily longer than C, and when they are both made elastic in either of the ways above described I find that the arrangement is unnecessarily complicated. The attachment of the cutting apparatus to the said elastic corner I effect by means of the ordinary hinge, *d d*, Fig. 2, but which I so construct that it may be readily converted into a rigid connection, or into an inverted rule-joint, or into a free hinge-joint, or into an ordinary rule-joint opening upwardly like Ball and Aultman's hinge attachment; but this would seldom, if ever, be desired, and of course could not legally be used by me, as that peculiar form of hinge was secured to Cornelius Aultman and Lewis Miller by Letters Patent bearing date the 17th day of June, 1856.

I attain my adjustable attachment by means of the dogs or pawls E and F in Fig. 2. The dog E, being attached to one ear of the hinge, may be shut down on the other ear in such position that the stud or projection G will come against it, and thereby prevent the outer end of the cutting apparatus from rising without acting upon the elastic bar C, so that in mowing over sudden inequalities or small stones either end of the cutting apparatus may rise, and by an elastic force will be brought quickly to the ground without bounding and wasting grass; and for mowing on new land, where a rigid connection is required in order to enable the driver to elevate the cutting apparatus quickly over a large fixed stone or small stump, as is often the case in mowing new land, then the dog E may remain as last described, and the dog F may be turned so as to shut against the inner end of the cutting apparatus and prevent the outer end from dropping; or, in other words, this would render the attachment of the cutting apparatus to the aforesaid yielding corner perfectly rigid and enable the driver, by means of the lever K, to raise it instantly from the ground to pass over an obstacle; yet the attachment of the cutting apparatus to the main machine would remain elastic, because in rising and falling it would be controlled by the elastic bar C; but when it is required to mow a very undulating surface, both of the said dogs should be thrown back, because it is absolutely necessary that the outer end of the cutting apparatus should be perfectly free to fall and rise in conformity to the surface.

When it is desired to alter the height of the stubble the hinge-pin L may be changed to another hole in the hinge ear M, and thus the height of the front of the cutting apparatus would be changed and the length of stubble would be correspondingly altered without destroying the inclination of the cutting apparatus to follow the surface of the ground, and the stubble would therefore be perfectly uniform. I have devoted much time to the arrangement of a lever for raising the cutting apparatus over obstacles, and I find it desirable that this element of the machine should unite certain qualities not heretofore attained, such as the following: It should be so arranged that the cutting apparatus with which it is connected may rise a certain distance without causing the lever to rise suddenly, which has occasioned serious accidents to the driver in using other machines, and also that the cutting apparatus may fall a certain distance without permanently retaining the lever at its lowest point of depression, because, unless this is the case, whenever the driver raises the lever he would be required to reach so much farther and move the lever a considerable distance before it would act upon the cutting apparatus; and this lever should be so located that the driver can conveniently reach it with his right hand and draw it up and toward him, because that is the position in which he could exert his strength (in pulling) to the best advantage, and as he could exert more power in the first position of the lever, and as his strength would be exerted upon the lever with less advantage in proportion as it raised and approached nearer to him, it follows that the purchase should increase in about the same proportion, which would insure the best application of his strength in raising the cutting apparatus quickly from the ground, and then, if the lever is self-sustaining, he can instantly raise it and be at liberty to attend to his team in passing an obstacle, and can as quickly drop it again for work.

In the location, arrangement, and construction of my lever I have attained all of these advantages in the following manner: I hinge one end of the lever to the right-hand rear corner of the machine and make it of such length as will permit the driver to reach its front end conveniently, as seen at K in Fig. 1. About eight or ten inches in front of its rear end I hinge a chain, O, or slotted rod, and attach its lower end to the cutting apparatus. I make this chain of such length as will hold the lever in the most convenient position, and I attach a spring, P, to the frame, so that it will sustain the lever and prevent it, under ordinary circumstances, from dropping below a convenient position, and yet allow it to descend whenever the surface of the ground may require. Thus the lever is not caused to fly up when the cutting apparatus passes over an elevation, and it will instantly return to a convenient position whenever depressed. I locate the attachment of the lower end of the said chain with respect to the point at which the lever is hinged to the frame so that when the lever is elevated slightly beyond a perpendicular the line of the chain will be slightly back of the point at which the lever is hinged to the frame, and I place a stop, R, on this hinge, so that the lever cannot go any farther back, and therefore will be held in this position by the weight of the cutting apparatus, and therefore the arrangement would be self-sustaining.

For convenient transportation the cutting apparatus may be folded up, as seen in Fig. 3, which reduces the machine to the narrowest possible compass. I have made repeated experiments to determine the best means of elevating the cutting apparatus into this position. I have tried to do it by different attachments of an arm or lever to its inner end, by which the driver could pull it over; but having found that the best position for it when folded was perpendicular, in order to have the machine as narrow and convenient as possible for transportation, and that the best way to hold it up after it was elevated was to hook a long rod into it and into an eye on the opposite side of the frame, I discovered that I could first hook this rod into the cutting apparatus at v, and then pull it up, and then fasten it up by the rod in the form of a brace, as seen at S in Fig. 3. This arrangement enables the driver to fold up the cutting apparatus without leaving his seat, which is often of great importance when using a spirited team.

The location of the cutting apparatus may be at the front end of the machine instead of the rear end, in which case, of course, the relative position of the parts above described would be correspondingly changed, but their objects and merits would remain nearly the same.

Having thus described my improvements in mowing-machines, what I claim therein as new, and desire to secure by Letters Patent, is—

1. Connecting the cutting apparatus with the machine by an adjustable attachment which can be changed from a free hinge to a joint rigid in one direction or in both directions, for the purposes and in the manner substantially as set forth.

2. The employment of a raising-lever of the second order with a gradually-increasing purchase by which it is made self-sustaining.

3. Keeping the lever in a convenient position for operation by the hand of the driver by means of a spring, substantially as and for the purposes specified.

M. G. HUBBARD.

Witnesses:
E. E. LEWIS,
R. G. COLEMAN.